No. 648,378.                      Patented May 1, 1900.
O. BEHREND.
SYSTEM OF ELECTRICAL DISTRIBUTION.
(Application filed Dec. 28, 1897.)
(No Model.)
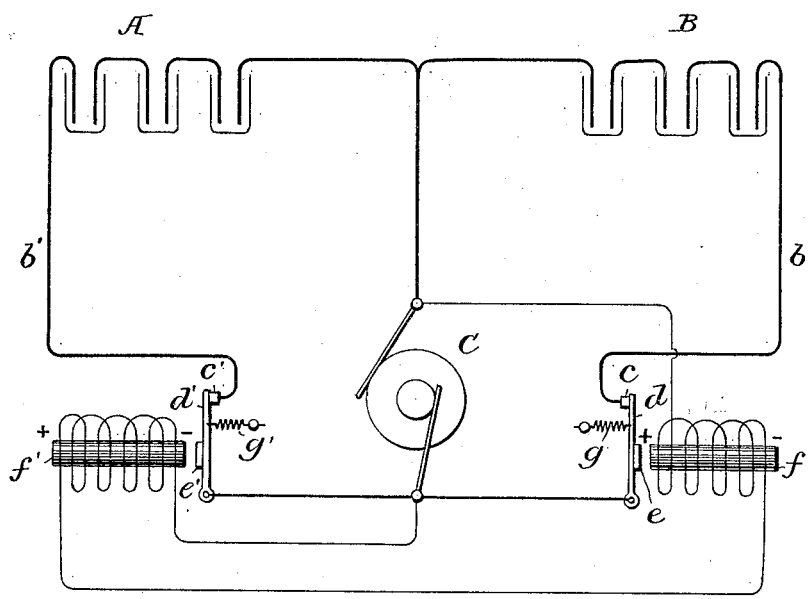
Witnesses
Inventor
Oskar Behrend
by Foster Freeman
Attorneys

UNITED STATES PATENT OFFICE.

OSKAR BEHREND, OF FRANKFORT-ON-THE-MAIN, GERMANY.

SYSTEM OF ELECTRICAL DISTRIBUTION.

SPECIFICATION forming part of Letters Patent No. 648,378, dated May 1, 1900.

Application filed December 28, 1897. Serial No. 663,989. (No model.)

*To all whom it may concern:*

Be it known that I, OSKAR BEHREND, a subject of the Emperor of Germany, and a resident of Frankfort-on-the-Main, Germany, have invented certain new and useful Improvements in Means for Producing from Alternating-Current Generators Continuous-Current Effects, of which the following is a specification.

The object of this invention is to provide means for producing from alternating-electric-current generators continuous-current effects, such as are necessary, for example, for charging electric accumulators or for purposes of electrolysis.

I will describe an application of the invention to the charging of accumulators.

The accumulators to be charged are divided into two groups A and B, between which are the terminals by which they are connected to one pole of the alternating-current generator C. The outer terminals $b$ of the accumulator groups are connected to the other pole of the generator, each through a contact device, each such device consisting of a fixed contact $c$ $c'$ and a movable contact $d$ $d'$, the movable contacts being provided each with a spring $g$ $g'$, tending to make the contacts, and each with an armature $e$ $e'$ in proximity to one of two electromagnets $f$ $f'$, inserted in a shunt-circuit across the poles of the alternating-current machine. As the electromagnets are polarized every second impulse only will act upon each one of the armatures of the movable contacts, so that at each alternate impulse one electromagnet is excited and attracts its armature and removes the corresponding contact. The current then passes through the other contact and through one group of the accumulator. During the other impulses the other electromagnet is excited, and consequently removes the contact before made, and the current then passes through the other contact and the second group of the accumulator. Thus from the alternating current of the generator each group of the accumulator receives only current which passes in one direction. It will thus be seen that the main current from the alternating generator is divided and in each division or branch is arranged a translating device—such, for instance, as a secondary battery—and the current passes alternately to the translating devices and always in the same direction in each. One division or branch of the main circuit is opened, while the other is closed by means of the polarized electromagnetic switches, which are operated by a shunt from the alternating-current circuit, so that each switch makes or breaks its respective main branch circuit according to the direction of the current passing through the main-circuit branch.

Of course the same apparatus may be used for alimenting electrolytical baths from alternating currents.

I claim—

1. The combination with an alternating-current generator, of a branched main circuit, a translating device in each branch, and electromagnetic switches controlling each branch and connected in a shunt from the main circuit, substantially as described.

2. The combination with an alternating-current generator, of a branched main circuit, a translating device in each branch, and an electromagnetic circuit-breaker controlling each branch comprising a spring-controlled armature, a polarized magnet and a shunt-circuit from the main circuit including the magnets of the switches, substantially as described.

In testimony whereof I have signed my name to this specification in the presence of two subscribing witnesses.

OSKAR BEHREND.

Witnesses:
 FRANZ HASSLACHER,
 FRITZ STÜBER.